United States Patent
Shan et al.

(10) Patent No.: US 7,742,940 B1
(45) Date of Patent: Jun. 22, 2010

(54) METHOD AND SYSTEM FOR PREDICTING REVENUE BASED ON HISTORICAL PATTERN INDENTIFICATION AND MODELING

(75) Inventors: Jerry Zhaolin Shan, Palo Alto, CA (US); Lauren E. Turner, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2317 days.

(21) Appl. No.: 10/322,201

(22) Filed: Dec. 17, 2002

(51) Int. Cl.
*G06F 17/18* (2006.01)
(52) U.S. Cl. .............................. 705/10; 705/7; 705/35; 364/401; 364/468
(58) Field of Classification Search ...................... 705/10
See application file for complete search history.

(56) References Cited

U.S. PATENT DOCUMENTS

| 5,299,115 | A | * | 3/1994 | Fields et al. | ................... 705/10 |
| 5,459,656 | A | * | 10/1995 | Fields et al. | ................... 705/7 |
| 6,151,582 | A | * | 11/2000 | Huang et al. | ................... 705/8 |
| 6,205,431 | B1 | * | 3/2001 | Willemain et al. | ............ 705/10 |
| 6,611,726 | B1 | * | 8/2003 | Crosswhite | ................... 700/99 |
| 6,745,150 | B1 | * | 6/2004 | Breiman | ..................... 702/181 |
| 6,978,249 | B1 | * | 12/2005 | Beyer et al. | ................... 705/10 |
| 7,236,953 | B1 | * | 6/2007 | Cooper et al. | ............. 705/36 R |
| 2002/0174005 | A1 | * | 11/2002 | Chappel | ...................... 705/10 |

OTHER PUBLICATIONS

Peter Gascoyne, "One day at a time," Telephony (Aug. 25, 1997).*
Paul Bernard, "Three Simple Techniques for Improving Statistical Forecasts," 38 Prod. & Inv. Mgmt. J. 65 (1997).*
A. R. Abdel-Khalik & K. M. El-Sheshai, "Sales Revenues: Time-series Properties and Predictions," 2 J. Forecasting 351 (1983).*
David A. Kodde & Hein Schreuder, "Forecasting Corporate Revenue and Profit: Time-Series Models Versus Management and Analysts," 11 J. Bus. Fin. & Acct. 381, (1984).*
Horst Mendershausen, "Annual Survey of Statistical Technique: Methods of Computing and Eliminating Changing Seasonal Fluctuations,"5/3 Econometrica 234 (Jul. 1937).*
Warren H. Hausman, "Multiproduct Production Scheduling for Style Goods with Limited Capacity, Forecast Revisions and Terminal Delivery," 18/7 Management Science 370 (Mar. 1972).*

(Continued)

*Primary Examiner*—Andre Boyce
*Assistant Examiner*—Justin M Pats

(57) ABSTRACT

A method and system is used to predict a behavioral value for a forecast period based on historical pattern identification and modeling. A set of training periods is compiled, and for each of the training periods, a generalized percentage function of the behavioral values is defined and computed. The training periods and their corresponding generalized percentage functions are further normalized and generalized, respectively, so that all training periods have the same length as the forecast period. A prediction time series is computed from the generalized percentage functions. The prediction time series is used to forecast a set of values in the forecast period based on a current behavior value. In one example, the behavior values are revenue and calculated over monthly training and forecast periods.

30 Claims, 5 Drawing Sheets

OTHER PUBLICATIONS

William R. Bell & Steven C. Hillmer, "Issues involved with the seasonal adjustment of economic time series," 20 J. Business & Economic Statistics, 98 (Jan. 2002).*

Eckel and Walters, Calibrated Probabilistic Quantitative Prediction Forecasts Based on the MRF Ensemble, Weather and Forecasting, vol. 13, Dec. 1998, p. 1132-47.*

Folland et al., Predictability of Northeast Brazil Rainfall and Real-Time Forecast Skill, 1987-98, Journal of Climate, May 1, 2001, p. 1937-58.*

SAS/ETS User's Guide, SAS, 1999, http://www.uc.edu/sashtml/ets/index.htm (online reprint p. 1-25).*

* cited by examiner

METHOD AND SYSTEM FOR PREDICTING REVENUE BASED ON HISTORICAL PATTERN INDENTIFICATION AND MODELING

FIELD OF THE INVENTION

The present invention relates in general to prediction methods, and in particular prediction of revenue and other business data based on historical pattern identification and modeling.

BACKGROUND OF THE INVENTION

Businesses today are under intense pressure to compete in an environment of tight deadlines and reduced profits. One key to being successful in this environment is having timely and accurate financial and other business performance data that reflects the state of the corporation. It would be difficult for a modern large enterprise to be successful without accurate gathering and analysis of financial and other business performance data.

Businesses rely on financial data in order to support decision-making. The financial data is maintained in computerized financial reporting systems. For some large entities, these reporting systems process large numbers of complex transactions occurring at locations around the world. Businesses attempt to use this data to determine some behavior, such as predicted end-of-month revenue, for supporting business decisions. However, modeling the complex financial transactions of the large enterprise is very difficult.

Traditionally, business enterprise data has been kept in databases that are sometimes specialized and often separate from other data repositories. Data may be stored in various incompatible databases and formats across corporate divisions. A major task in managing the large enterprise is effectively gathering this data into repositories for analysis within various levels of the organization.

Recently, businesses have started exploring the feasibility of applying traditional statistical analysis techniques to large databases for the purpose of discovering hidden data attributes, trends, and patterns. This exploration, known as data mining, has evolved into the creation of analytical tools based on a wide collection of statistical techniques.

For a corporation, the discovery of previously unknown statistical patterns or trends can provide valuable insight into the function and environment of their organization. Data-mining techniques allow businesses to make predictions of future events, whereas analysis of warehoused data only gives evidence of past facts.

A common approach to analyzing this data is to have a human expert extract, sort, and process important parts of the data for trend analysis and forecasting. This method can be effective, but is rather slow and highly dependent on the skill of the analyst. Although the use of computers makes arranging and viewing the date much more convenient, traditional computing operations still require human interaction to spot trends in order to provide acceptable results on which to base important business decisions.

Due to ever shortening business cycles and the need to distribute information to all parts of the enterprise, legacy business processes that require data to be extracted and manually manipulated before use will be much less desirable. Instead, enterprises will need rapid decision support based on rapid analysis and forecasting of future behavior.

A system and method that address the aforementioned problems, as well as other related problems, are therefore desirable.

SUMMARY

To overcome limitations in the prior art described above, and to overcome other limitations that will become apparent upon reading and understanding the present specification, the present invention discloses a method and system for predicting a behavior value based on historical pattern identification and modeling.

In accordance with one embodiment of the invention, a computer-implemented method is provided for determining a total forecasted behavior value for a forecast period having a plurality of discrete time points. The method involves reading a plurality of behavior values from each of a plurality of training periods preceding the forecast period. Each behavior value is associated with a discrete time point within the training period. These behavior values may include cumulative sums of all data values within the respective training period up to and including the data value at the discrete time point associated with the behavior value.

A percentage function is generated associated with each training period. The percentage function represents percentages of behavior values relative to a behavior value total within the respective training period. Respective generalized percentage functions are formed from the percentage functions of the training periods. Each generalized percentage function has a period equal to the forecast period. A behavior time series is generated as a function of the generalized percentage functions at each discrete time point of the forecast period. A total forecasted behavior value is then generated as a current behavior value divided by the value of the behavior time series at a current discrete time point of the forecast period.

In another embodiment of the present invention, a system for calculating a total forecasted revenue for a forecast period having a predetermined time range and a plurality of discrete time points includes a storage arrangement arranged for storing historical behavior data at a plurality of discrete time points. A computing arrangement is configured to 1) derive a percentage function as a function of the behavior values and total behavior value of the training period for each training period, 2) scale each percentage function to form an associated generalized percentage function so that each generalized percentage function covers a time range equal to the time range of the forecast period, 3) calculate a behavior time series from the generalized percentage functions, and 4) derive the total forecasted behavior as a function of the current cumulative sum by the value in the behavior time series associated with a current discrete time point of the forecast period.

The above summary of the present invention is not intended to describe each illustrated embodiment or implementation of the present invention. This is the purpose of the figures and the associated discussion that follows.

BRIEF DESCRIPTION OF THE DRAWINGS

The invention is described in connection with the embodiments illustrated in the following diagrams.

DETAILED DESCRIPTION

Figure 1:
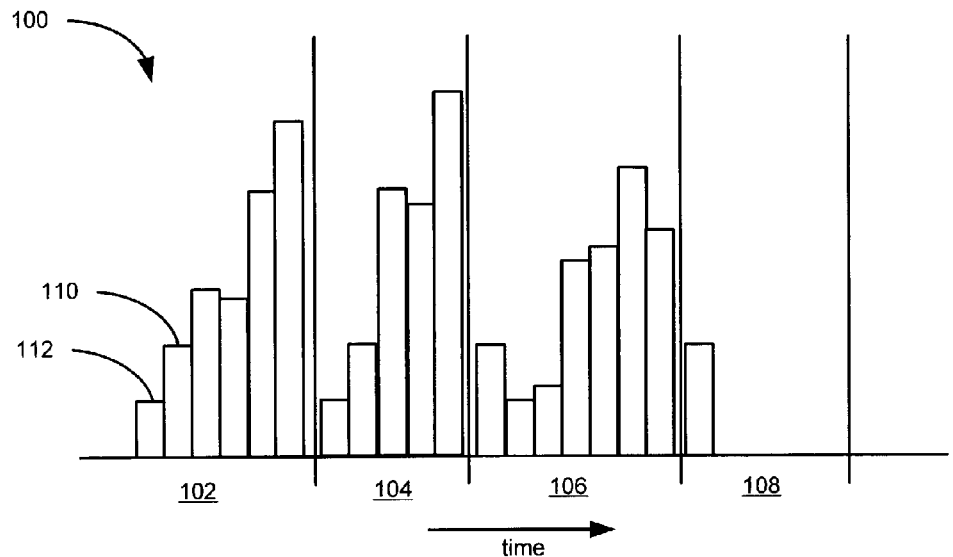
FIG. 1 is a timeline showing training periods and a forecast period in accordance with principles of the present invention.

In the following description of an example embodiment, reference is made to the accompanying drawings that form a part hereof, and in which is shown by way of illustration various manners in which the invention may be practiced. It is to be understood that other embodiments may be utilized, as structural and operational changes may be made without departing from the scope of the present invention.

Most existing prediction methods in the literature and in implementation of commercially available software are based on various time series. These models can be classified as structured and unstructured models. Unstructured models appear in statistical literature such as the Autoregressive Integrated Moving Average (ARIMA), for which the various effects causing data fluctuations need to be extracted from the models. The structured models, on the contrary, assume the various effects explicitly in the models.

Unstructured models usually assume that the observed daily data, or the difference data of proper multiple orders, is a stationary stochastic process. The differencing part attempts to identify and quantify the trends. To further catch any seasonal effects, seasonal differencing is also applied.

Seasonal differencing has some difficulties in its application. Identifying the order of differencing is needed to successfully qualify a trend. This currently can only be done through an expert's interactive analysis. Further, to effectively quantify a seasonal effect, we need to identify the seasonal cycle, which can be difficult in a constantly changing business environment.

Seasonal effects can have multiple layers of trends each occurring over different time periods such as monthly, quarterly, and yearly. The fact that the fiscal month, quarter, and year can be different from their calendar counterparts produces additional complexity. No matter what orders of differencing are performed, the resulting data can still be highly non-stationary for data like daily revenue loaded from financial reporting systems. There are many factors that cause revenue or other data from transaction processing systems to be irregular, such as scheduled or unscheduled system downtime.

The structural model overcomes the difficulties of having to perform the differencing task because it explicitly specifies the many effects in the model, including trend and seasonality. However, if a particular effect is not explicitly specified, but it turns out the effect does exist, there is no way to extract it from the fitted model later on. In addition, the omission of an existing effect from the model can seriously compromise the identification and estimation of other effects.

For the daily revenue data, identifying all major effects beforehand is near impossible. Examples of effects that cannot be predicted include macroeconomic trends such as a major downturn in an industry. For structured models, there are still many significant open issues such as estimation initialization for trend and seasonality in the various prediction methods.

In general, a method according to the present invention is a forecasting model that uses a set of preceding training months to predict a trend for the current month. This method is advantageous in comparison to prior art structured and unstructured methods of data prediction. It does not require any differencing steps of uncertain nature as required by unstructured models, nor does it require a priori modeling of trends of uncertain nature as required by structured models.

In a method according to the present invention, the cumulative percentage at any given time point in a month automatically reflects the underlying trends in a month. The use of recent months as training months to construct a monthly behavior model automatically reflects the many more general trends and effects other than the trend within the month.

For purposes of illustration, the invention is described below in terms of revenue prediction. However, concepts of the present invention can be applied to any type of cumulative indicator that is quantifiable and amenable to forecasting based on cyclic phenomena. Such indicators include revenue, sales, expenditures, labor-hour reporting, product demand, traffic patterns, network usage, etc. Therefore, references to revenue prediction are provided for purposes of illustration, and not of limitation.

It is also appreciated that any appropriate time periods and time points can be used in a method according to the present invention. The choice of time periods will depend on the behavior being analyzed and the expected repetition patterns within such behaviors.

Turning now to FIG. 1, a timeline 100 is shown with cumulative revenue data for three training periods 102, 104, and 106 preceding a forecast period 108. The training periods 102, 104, 106 and forecast period 108 show revenue as a discrete value for each of the time points within the periods. These time points could correspond to days, weeks, months, quarters, years, etc. For purposes of illustration, the periods in FIG. 1 are assumed to be months and each revenue point within the period will be the cumulative daily revenue through the corresponding time point.

Each of the discrete data points in FIG. 1, such as 110 and 112, represent the cumulative revenue sum for that day. The cumulative sums are the sums of the revenue within the same period up to and including the revenue at the day of interest. Note that the cumulative sums may not always increase with time, as the behavior value of interest on any given day can be negative.

FIG. 1 illustrates the case where periods 102, 104, 106, 108 may have different lengths. Therefore, for each of the training months 102, 104, 106 to be useful predictors of the forecast month 108, the data in the training months should be presented in a form that keeps the monthly cyclic nature of the training months intact while still accurately representing both shorter and longer period trends.

In the examples herein describing months as historical periods, it is appreciated there are more than one type of monthly period may be used in calculating business performance data. In particular, a distinction can be made between calendar months and fiscal months. In recognizing revenue, a fiscal month can go several days beyond a calendar month. For example, for the calendar month January, the days include January 1 through January 31. But for the fiscal month January, the days in the month include January 1, January 2, ..., January 31, February 1, ... February K, where K is usually a variable. The exact amount of K is unknown until the fiscal month actually ends.

In some cases, what is known beforehand is that the fiscal month extends beyond the calendar month by some range of days. For example, K can range from six to twelve calendar days in some applications. Other than that, there is little visibility into K because it is not usually known when the fiscal month will be closed.

The lag K into the following calendar month is mainly due to two factors. One is system delay in revenue recognition, and the other is the month end adjustment on items such as currency rate adjustment. Also note that for the next fiscal month, say, February, it starts on February 1, not at the close of the fiscal month January. Therefore, in terms of time points and forecast periods as used in describing the present invention, there may be overlaps between consecutive fiscal months. For the recognized revenue, however, there is no overlap.

Hence, forecasting the total revenue for a fiscal month is more involved than forecasting the total revenue for a calendar month. Three specific differences in forecasting revenue for a fiscal month versus a calendar month are worth noting. First, each covers differing time period lengths, although this difference is trivial. Second, a calendar month is of fixed length, known even before it starts, whereas a fiscal month is of variable length, unknown until it ends. Finally, the daily revenue stream recognized for the fiscal month after the main calendar month is over has very different statistical characteristics than the daily revenue stream recognized for the fiscal month in the main calendar month.

When making predictions for a fiscal month period, the daily recognized revenue is used. For example, the first revenue point of the forecast period 108 can be considered the recognized revenue at that point. The daily revenue on day n is the total recognized revenue for the day in the main calendar month, where n=1, 2, ..., N. Here N denotes the last day of the main calendar month. The cumulative daily revenue, denoted by $S_n$, represents the cumulative sum (month to day amount) from day 1 through day n. Therefore, $S_N$ is the total revenue in the calendar month. The total revenue for the fiscal month is represented by $S_T$ (T stands for total), and the combined amount for the delayed revenue and the month end adjustment amount by $S_p$. Therefore $S_T$ is expressed as:

$$S_T = S_N + S_D, \quad (1)$$

Note that when making fiscal period forecasts, the objective is to forecast $S_T$, not $S_N$.

The first step in transforming the data is to change the cumulative revenue values such as shown in FIG. 1 to cumulative percentage values. The cumulative percentage up to the nth day is found according to the following ratio:

$$R_n = S_n/S_T \quad (2)$$

$$R_n = S_n/(S_N + S_D) \text{ where } n=1, 2, \ldots, N \quad (3)$$

Note that this percentage ratio is a variation of the usual percentage concept. The denominator includes not only $S_N$, the total in the calendar month, but also includes $S_D$, the month end adjustment amount for fiscal periods. The domain of the function definition, indexed by n, is all days in the calendar month, not all days in the fiscal month. When using the regular percentage (i.e., $S_n/S_N$), we can only forecast the total for the calendar month. However, the addition of $S_D$ in the denominator advantageously allows dynamic adjustment due to a variable forecast period length for $S_T$.

Figure 2:
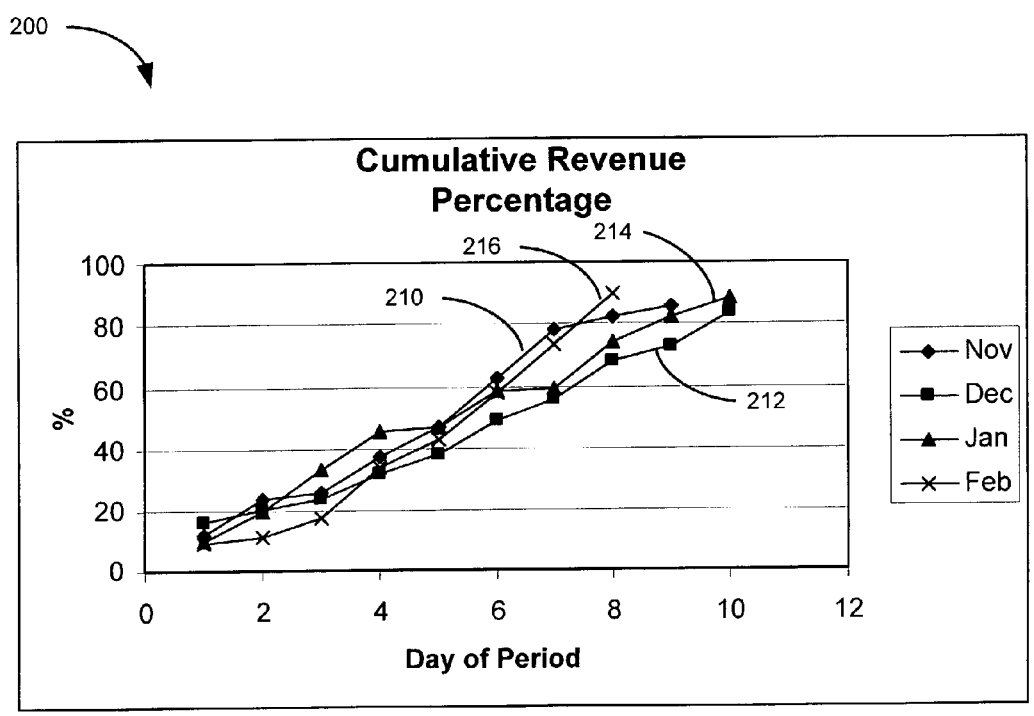
FIG. 2 is a graph of piecewise linear functions representing cumulative percentages for four training months according to concepts of the present invention.

FIG. 2 illustrates a sample training scenario used in describing concepts of the present invention. FIG. 2 is a graph 200 of cumulative revenue percentage functions 210, 212, 214, 216 for four training months corresponding to November, December, January, and February, respectively. For ease of illustration, the months of November, December, January, and February are assumed to have lengths of nine, ten, eight and ten days, respectively.

The revenue percentage functions 210, 212, 214, and 216 in FIG. 2 have been formed from raw revenue values using concepts in accordance with equations (2) and (3). Each point $R_n$ in the revenue percentage functions 210, 212, 214, and 216 represent a cumulative percentage of the monthly revenue for that day of the month.

The revenue percentage functions 210, 212, 214, and 216 in FIG. 2 are shown as piecewise linear functions. The vertices of the piecewise linear functions lie on a day of the period. Representation of the revenue percentage functions 210, 212, 214, and 216 as piecewise linear is useful when illustrating linear interpolation, however other methods of modeling revenue functions such as least-squares fits of quadratic or spline curves may be useful in some applications.

In general, the training periods may have different lengths as shown in FIG. 2. A step in capturing the cyclical behavior contained within the training periods is to normalize all of the periods to have the same length. In particular, the training periods should be normalized to the length of the current forecast period.

Figure 3:
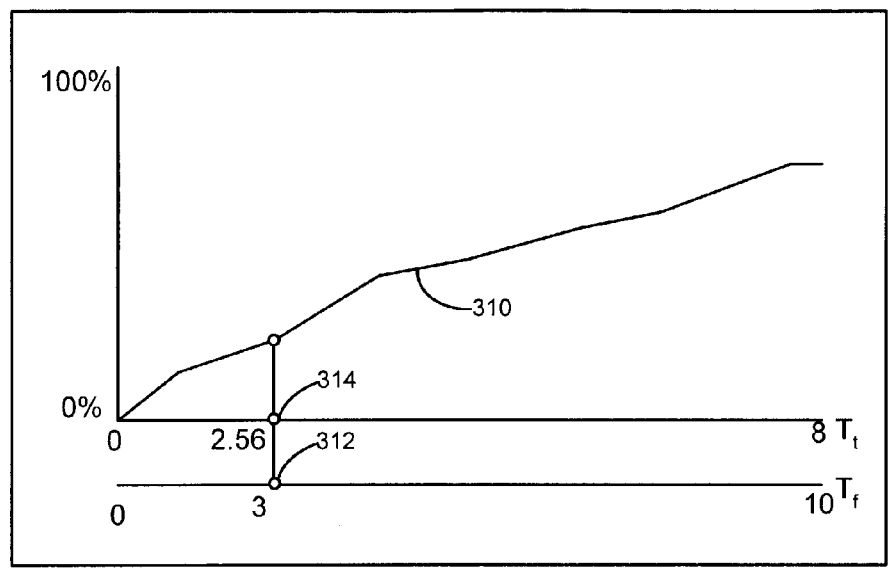
FIG. 3 is a plot illustrating the normalization of a behavior curve in accordance with concepts of the present invention.

FIG. 3 is a graph 300 showing a piecewise linear representation of a revenue percentage function 310. The revenue percentage function 310 is used as a training function $F_t(t)$ covering a period of length $T_t$. The training function $F_t(t)$ will be converted to a forecast function $F_f(t)$ having a period equal to the forecast period, $T_f$. In this example, the training period $T_t$ is eight days and the forecast time period $T_f$ is ten days.

It is assumed that on the first and last days of the period, both the training function and the forecast function have the same value:

$$F_t(1) = F_f(1) \quad (4)$$

$$F_t(T_t) = F_f(T_f) \quad (5)$$

The training period is divided into segments equal to the number of days in the forecast period $T_f$. Therefore, at each discrete time point t in the forecast function, the value of the forecast function is found from the training function as follows.

$$F_f(t) = F_t(1 + (t-1)(T_t-1)/(T_f-1)), t=1, 2, \ldots, T_f \quad (6)$$

In the example of FIG. 3, a discrete time point 312 at forecast day three (t=3), corresponds to the training time point 314, and is calculated as follows:

$$F_f(3) = F_t(1 + (3-1)(8-1)/(10-1)) = F_t(2.56). \quad (7)$$

The estimation of $F_t(2.56)$ can be made by various techniques known in the art. In one application, a linear interpolation of the function 310 is used to obtain the value $F_t(2.56)$. To complete the normalization process, the forecast function $F_f$ is found by interpolating the training function $F_t$ for every day in the forecast period.

Figure 4:
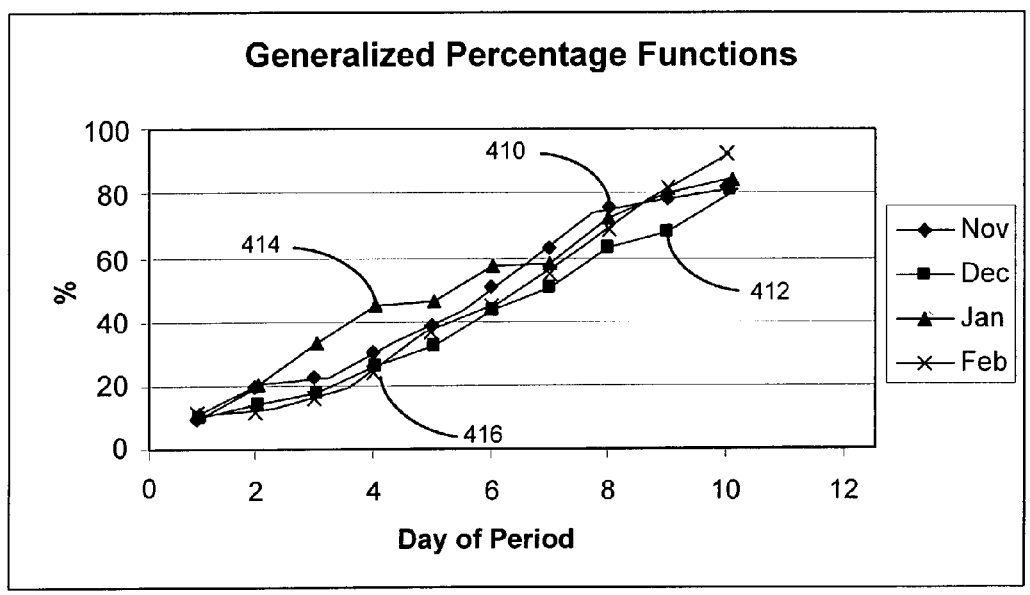
FIG. 4 is a graph of the functions of FIG. 2 after being normalized to the generalized percentage functions in accordance with concepts of the present invention.

FIG. 4 shows how the revenue percentage functions 210, 212, 214, and 216 of FIG. 2 have been converted to the generalized percentage functions 410, 412, 414, and 416 for a forecast month having ten days. This involves normalizing the revenue percentage functions 210, 212, 214, and 216 to a ten-day period as described in relation to FIG. 3.

The generalized percentage functions 410, 412, 414, and 416 represent the behavioral effects of their respective training periods over a time scale normalized to that of the forecast month. Next, a prediction series is derived from the value of the functions 410, 412, 414, and 416 at each day of the forecast month.

Figure 5:
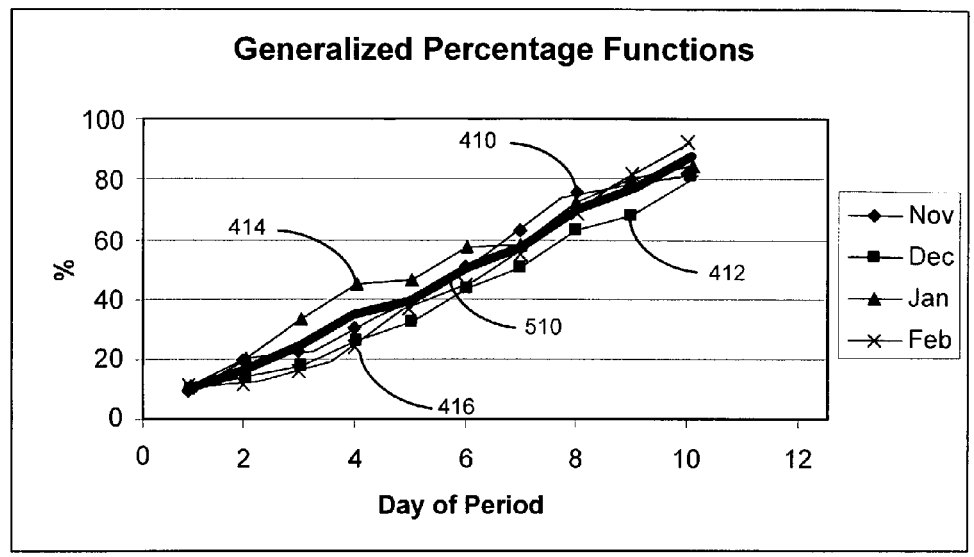
FIG. 5 is a graph showing the expected behavior function as derived from the generalized cumulative percentages of FIG. 4 and in accordance with concepts of the present invention.

In FIG. 5, a prediction series 510 is shown overlaid on the generalized percentage functions 410, 412, 414, and 416. In general, the prediction series 510 is formed as a function of the generalized percentage functions 410, 412, 414, and 416. Typically, each point of the prediction series 510 is formed as a robust average value of the generalized percentage functions 410, 412, 414, and 416 at the each day in the forecast period.

One useful method of obtaining daily values of the prediction series 510 is to calculate the median value of the percentage functions 410, 412, 414, and 416 at each point in the time series of the forecast month. Use of the median value helps negate the effect of outlier data, which is usually present in any real world data set.

Figure 6:
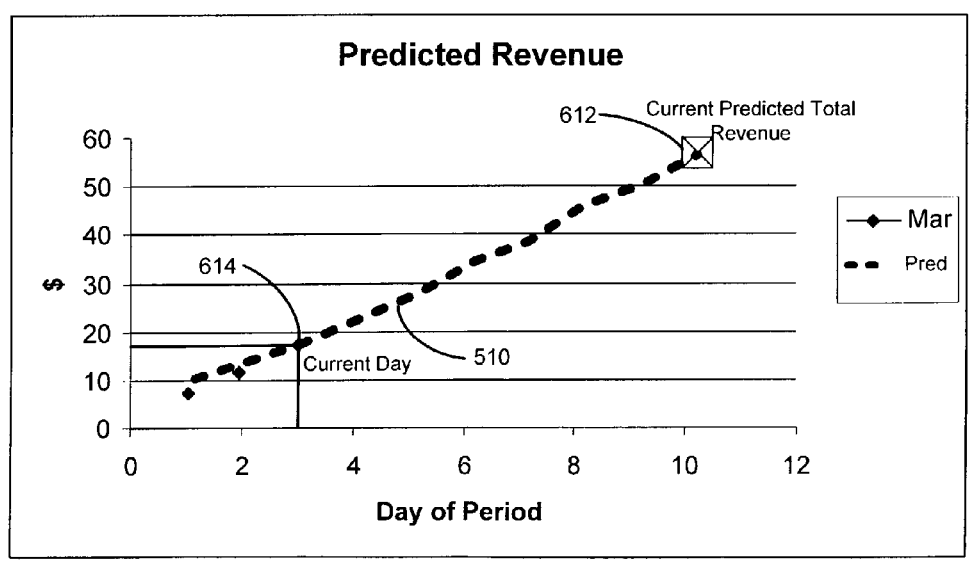
FIG. 6 is a graph of the prediction function, calculated based on the expected behavior function of FIG. 5, and is to be utilized in a forecast month to make a total revenue prediction in accordance with concepts of the present invention.

Once the prediction series 510 has been generated for the forecast month, the series 510 can be used to predict the revenue behavior for the rest of the month, and in particular the total revenue for the month. FIG. 6 shows how the prediction series 510 is used to generate a forecast. At each day in the forecast month, a cumulative revenue sum is calculated. In the example of FIG. 6, the most current day of the month (March) is day three, with cumulative revenue corresponding to point 614 at day three. To derive the predicted revenue 612, the cumulative sum at point 614 is divided by the value of the corresponding time point (i.e. day three) in the prediction series 510. Of course, division by zero must be taken into account and avoided when the total revenue prediction 612 is calculated.

Figure 7:
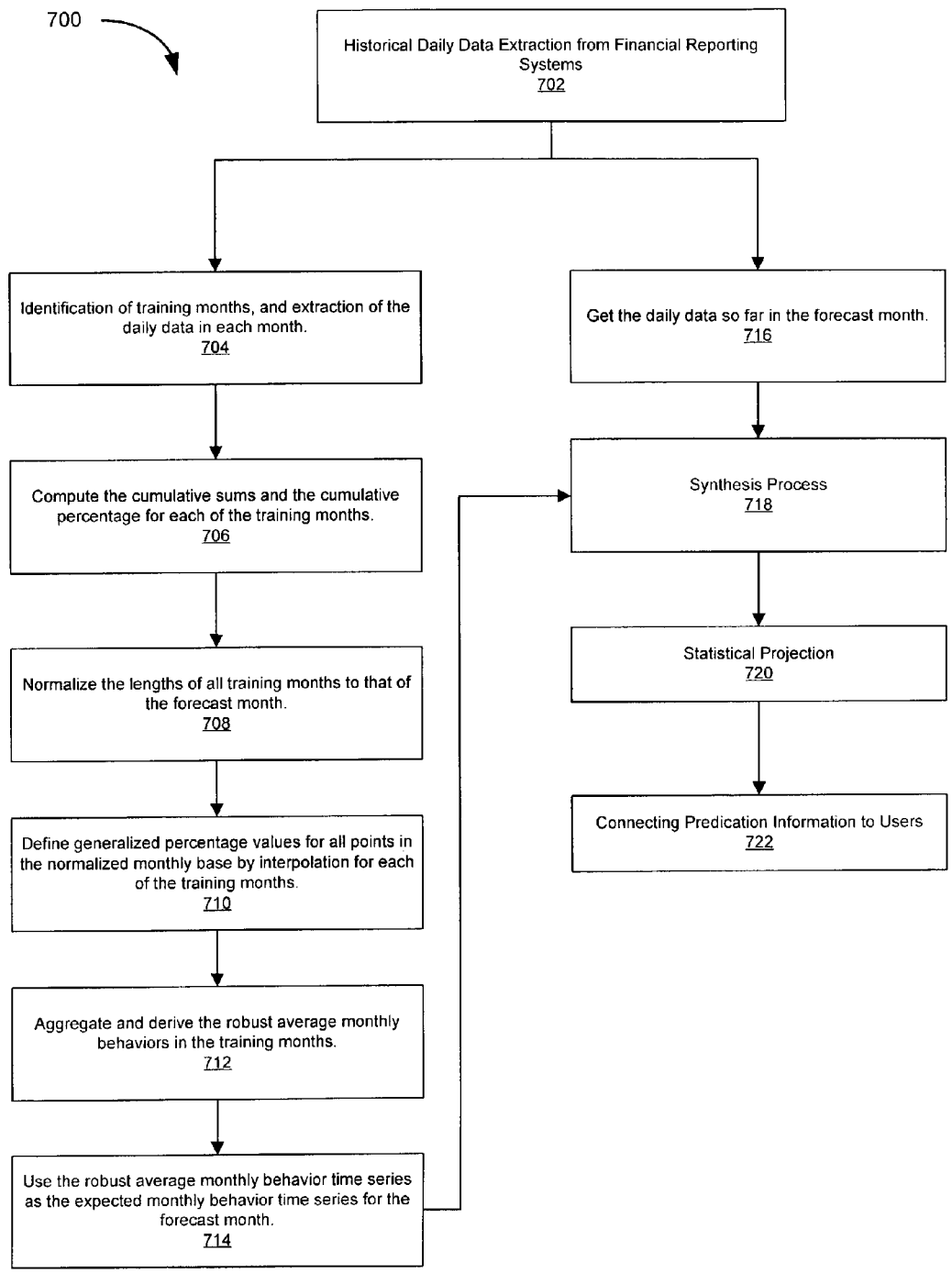
FIG. 7 is a functional flowchart showing steps in producing a behavioral predictive value in accordance with the present invention.

FIG. 7 shows a flowchart 700 that illustrates the concepts of the invention as described hereinabove. Extraction of present and historical data occurs at step 702. At step 704, the training periods (e.g. months, quarters, years, etc) are identified and the extracted data is organized within each training period at discrete time points (e.g. days, weeks, months).

At step 706, the cumulative sum and cumulative percentage at each discrete time point within the training period are calculated. This step will result in a plurality of cumulative behavior functions such as seen in FIG. 4, as well as a set of non-normalized cumulative percentage functions. At step 708, the percentage functions are normalized so that each has a length equal to that of the forecast period. In step 710, the value of each normalized percentage function is determined by interpolation for each discrete time period in the forecast month. This results in a set of functions and data points as illustrated in FIG. 5.

At step 712, the data from the training periods is aggregated to derive a robust average value at each discrete time point in the forecast period. As previously described, this could be a simple average, a weighted average, a median, etc. If the number of selected training periods is too small, a sample size problem may exist when taking the average or median. In that case, at each point in the generalized percentage function neighborhood points can be borrowed when making average or median calculations. These average values are used at step 714 to create the behavior time series for the forecast period.

In step 716, the current data is taken from the data set that was extracted from the reporting systems at step 702. The current data is synthesized with the behavior time series at step 718. The result of this synthesis is the statistical projection obtained at step 720. This is the step where the predicted behavior, such as total monthly revenue, is obtained. Finally, the prediction information is connected to the users of the prediction at step 722.

Figure 8:
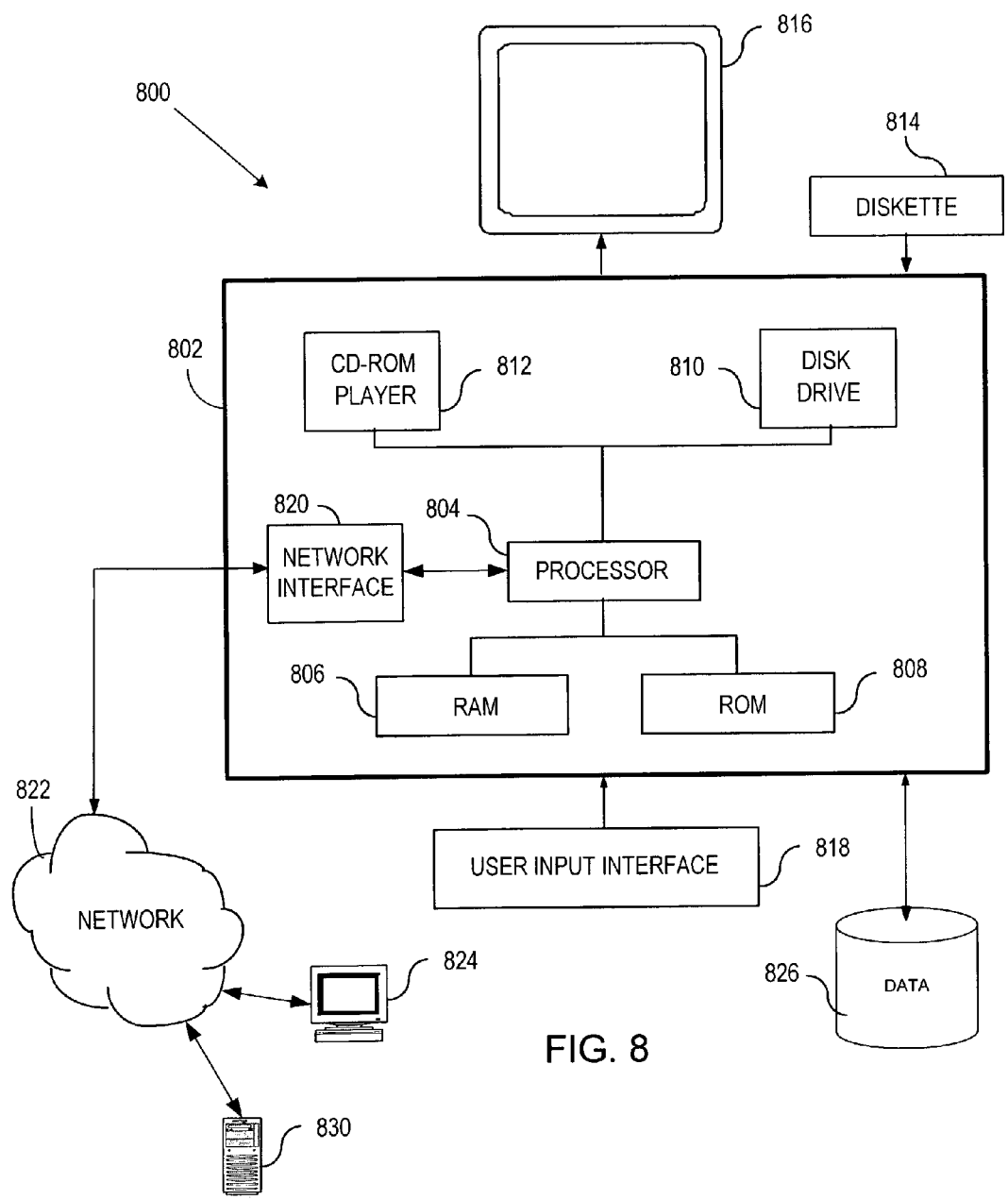
FIG. 8 is a diagram of a computing apparatus embodying behavior prediction in accordance with concept of the present invention.

FIG. 8 shows a system 800 utilizing concepts of the present invention. The system includes a computing apparatus 802 with a processor 804 coupled to some form of data storage. The data storage may include volatile memory such as RAM 806. Other devices that the apparatus 802 may use for data storage and retrieval include a ROM 808, disk drive 810, CD-ROM 812, and diskette 814. A display 816 and user input interface 818 are attached to the computing apparatus 802 to allow data input and display. The computing apparatus 802 includes a network interface 820 that allows the apparatus to communicate with other computing devices 824 across a network 822.

In one embodiment of the invention, the computing apparatus 802 extracts historical data (as described in step 702 of FIG. 7) from a database 826. The computing apparatus uses the processor 804 and memory 806 to calculate the predicted behavior in accordance with the steps described in FIG. 7. The predicted data may be shown on the display 812, stored to persistent storage 810, 812, 814, or published over the network 822.

In one arrangement, the predicted data is calculated at regular intervals and served to other computing devices over the network using the hypertext transport protocol (HTTP) on a web site. The HTTP server can run on the computing apparatus 802 or on another server 830.

Even though the invention is described in terms of terms of financial revenue prediction, those skilled in the art will appreciate that teachings of the present invention could be adapted to other cumulative behavior predictions. The periods and divisions used for pre-determining training periods and time steps therein can be any applicable to the problem at hand.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of the example embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A computer-implemented method for determining a total forecasted behavior value for a forecast period having a plurality of discrete time points, the method comprising:

reading into a computer memory, a plurality of behavior values from each of a plurality of training periods preceding the forecast period, each behavior value associated with a discrete time point within the respective training period, wherein two or more of the training periods have different lengths;

generating in the computer memory by a computer processor, a percentage function associated with each training period, the percentage function representing percentages ($R_n$) of the behavior values relative to a behavior value total within the respective training period, wherein the percentages $R_n$ are calculated from cumulative revenue values of respective multiple first intervals, a total revenue for a second interval including the multiple first intervals, and a value representing a combination of delayed revenue and an adjusted revenue amount for the end of the second interval;

forming in the computer memory by the computer processor, respective generalized percentage functions by normalizing the percentage functions, each generalized percentage function having a period equal to the forecast period, wherein respective generalized percentage functions having periods equal to the forecast period are formed from the percentage functions associated with the respective training periods where at least two of the training periods have different lengths;

generating a behavior time series in the computer memory by the computer processor, as a function of the generalized percentage functions at each discrete time point of the forecast period;

generating in the computer memory by the computer processor, the total forecasted behavior value as a function of a current behavior value divided by a value of the behavior time series associated with a current discrete time point of the forecast period.

2. The method of claim 1, wherein the plurality of behavior values comprise cumulative sums, the cumulative sums including a sum of data values within the respective training period up to and including a data value at the discrete time point associated with the cumulative sum, and wherein the current behavior value comprises a sum of data values in the forecast period up to and including a data value associated with the current time point.

3. The method of claim 2, wherein the cumulative sums comprise cumulative revenue sums.

4. The method of claim 1, further comprising publishing the total forecasted behavior as an updated forecast at each discrete time period in the forecast period.

5. The method of claim 1, wherein generating the behavior time series as a function of the generalized percentage functions comprises calculating a median value of all the generalized percentage functions at each discrete time point of the forecast period.

6. The method of claim 1, wherein generating the behavior time series as a function of the generalized percentage functions comprises calculating an average value of all the generalized percentage functions at each discrete time point of the forecast period.

7. The method of claim 1, wherein the forecast period comprises a monthly forecast period and the training periods comprise monthly training periods.

8. The method of claim 1, wherein the forecast period comprises a fiscal month period.

9. The method of claim 8, wherein the fiscal month period is greater than an associated calendar month by a variable number of days.

10. The method of claim 1, wherein the training periods comprise fiscal month periods, wherein the fiscal month periods are greater than associated calendar months by a variable number of days.

11. The method of claim 1, wherein forming a particular one of the generalized percentage functions from a percentage function associated with a training period having a length different from the forecast period further comprises linearly interpolating values within the associated percentage function for each discrete time point of the forecast period.

12. The method of claim 1, wherein forming the generalized percentage functions further comprises setting the value of each generalized percentage function at the first discrete time point equal to the value of the associated percentage function at the first discrete time point.

13. The method of claim 1, wherein forming the generalized percentage functions further comprises setting the value of each generalized percentage function at the last discrete time point equal to the value of the associated percentage function at the last discrete time point.

14. The method of claim 1, wherein normalizing the generalized percentage functions comprises normalizing the training periods to have a same length.

15. The method of claim 14, wherein the same length is a length of the forecast period.

16. A system for calculating a total forecasted behavior value for a forecast period having a plurality of discrete time points, comprising:

a storage arrangement arranged for storing a set of behavior data points each associated with a discrete time point within a plurality of training periods, wherein two or more of the training periods have different lengths;

an electronic computing arrangement coupled to the storage arrangement and including a processor configured to:

derive a percentage function associated with each training period as a function of the behavior data points and a total behavior value of the respective training period, the percentage functions representing percentages ($R_n$) of the behavior data points relative to the total behavior value of the respective training period, wherein the percentages $R_n$ are calculated from cumulative revenue values of respective multiple first intervals, a total revenue for a second interval including the multiple first intervals, and a value representing a combination of delayed revenue and an adjusted revenue amount for the end of the second interval;

scale each percentage function to form an associated generalized percentage function so that each generalized percentage function covers a time range equal to a time range of the forecast period, wherein the generalized percentage functions that are associated with the percentage functions for the training periods having different lengths, have periods equal to the forecast period;

calculate a behavior time series as an aggregate of the generalized percentage functions; and derive the total forecasted behavior by dividing a current behavior data point by a value in the behavior time series associated with a current discrete time point of the forecast period.

17. The system of claim 16, wherein the set of behavior data points comprise cumulative sums, the cumulative sums including a sum of data values within the respective training period up to and including a data value at the discrete time point associated with the cumulative sum, and wherein the current behavior data point comprises a sum of data values in the forecast period up to and including a data value associated with the current discrete time point.

18. The system of claim 17, wherein the cumulative sums comprise cumulative revenue sums.

19. The system of claim 16, further comprising a display configured to show the total forecasted behavior.

20. The system of claim 16, further comprising a server configured to publish the total forecasted behavior as an updated forecast for each discrete time point in the forecast period.

21. The system of claim 20, wherein the server comprises a hypertext transfer protocol server.

22. The system of claim 16, wherein the computing arrangement is further configured to calculate the behavior time series by calculating a median value of all the generalized percentage functions at each discrete time point of the forecast period.

23. The system of claim 16, wherein the computing arrangement is further configured to calculate the behavior time series by calculating an average value of all the generalized percentage functions at each discrete time point of the forecast period.

24. The system of claim 16, wherein the forecast period comprises a monthly forecast period and the training periods comprise monthly training periods.

25. The system of claim 16, wherein the discrete time points of the forecast period comprise daily points and the discrete time points of the training periods comprise daily points.

26. The system of claim 16, wherein the forecast period comprises a fiscal month period.

27. The system of claim 26, wherein the fiscal month period is greater than an associated calendar month by a variable number of days.

28. The system of claim 16, wherein the training periods comprises fiscal month periods.

29. The system of claim 28, wherein the fiscal month periods are greater than associated calendar months by a variable number of days.

30. The system of claim 16, wherein the generalized percentage function formed from a percentage function associated with a training period having a length different from the forecast period is formed by linearly interpolating at discrete time points within the associated percentage function.

* * * * *